Feb. 6, 1968  K. W. SAWYER ETAL  3,367,403
REGENERATOR HUB SUPPORT
Filed Sept. 3, 1965  3 Sheets-Sheet 1
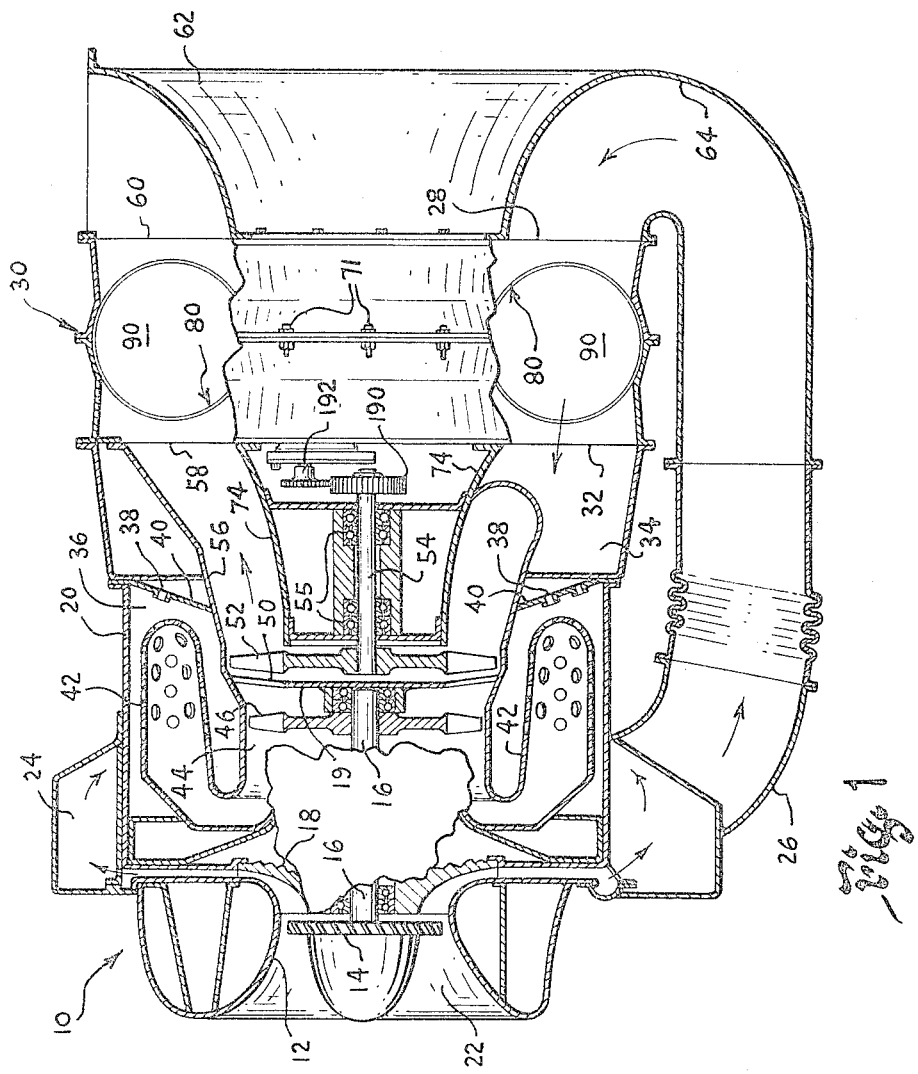
INVENTORS
KENNETH W. SAWYER
WILLIAM W. JACOBUS
BY
Steward & Steward
ATTORNEYS

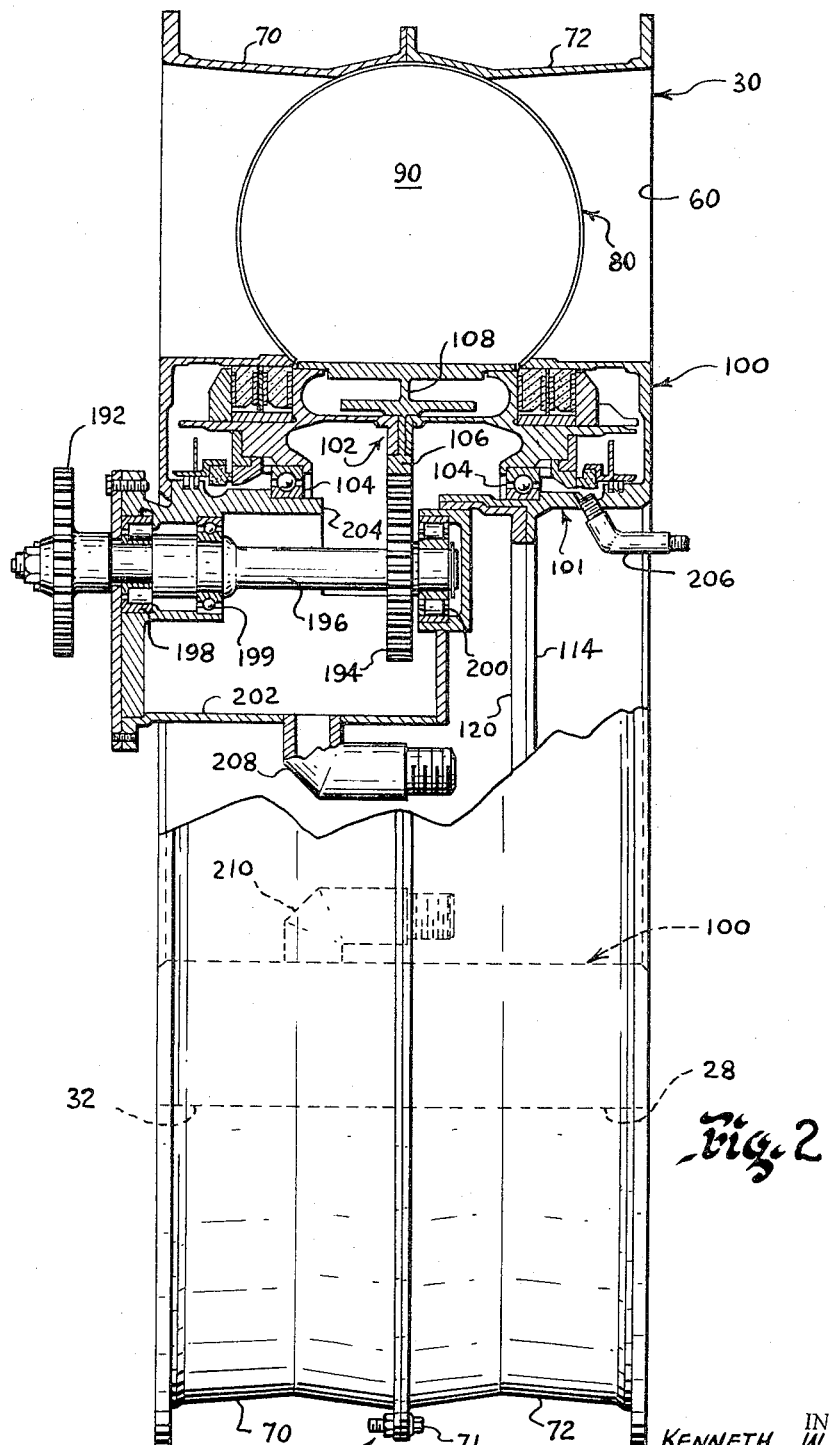

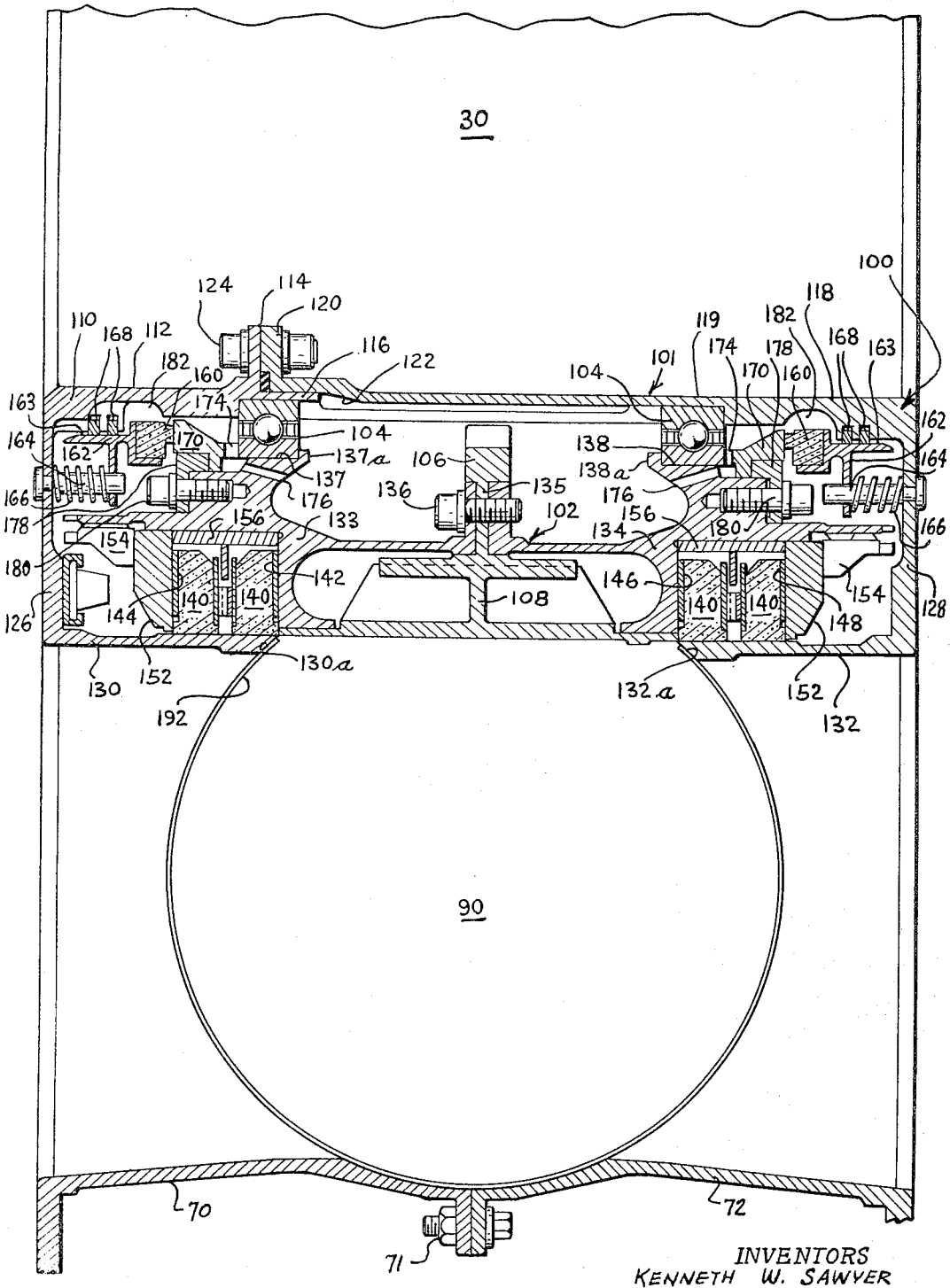

United States Patent Office 3,367,403
Patented Feb. 6, 1968

3,367,403
REGENERATOR HUB SUPPORT
Kenneth W. Sawyer, Thompsonville, and William W. Jacobus, Columbia, Conn., assignors to United Aircraft Corporation, East Hartford, Conn., a corporation of Delaware
Filed Sept. 3, 1965, Ser. No. 485,014
3 Claims. (Cl. 165—7)

ABSTRACT OF THE DISCLOSURE

A regenerative heat exchanger of the rotary type particularly suited for turbine engines, in which the heat exchanging matrix is of annular configuration and is supported for rotation within a conforming housing by a hub structure composed of mutually facing, joined channel members providing a stationary hollow annulus and by a complementary rotary member located therein and supporting said matrix externally thereof. All bearing support for the rotary member is disposed within the stationary annulus, and peripherally continuous seals of simplified design are disposed between the stationary and rotary hub members within the hub annulus to complete the enclosure of the bearings and bearing supports and permit a lubricant or coolant to be circulated thereover.

---

This invention relates to regenerative heat exchangers of the kind having a rotating heat accumulating matrix through which fluids are passed to effect transfer of heat from one to the other without intermingling the fluids. The invention is directed to improvements in the mounting of the rotary matrix member and the means of sealing the matrix to prevent by-passing or leakage of fluid around the matrix and from one portion of it to another, and is more especially concerned with the rotor mounting and sealing construction of torus type rotary heat exchangers.

The type of exchanger here involved carries a matrix in the rotating element, and as the element rotates, the matrix is carried alternatively through a zone where hot gas is directed through the matrix and gives up heat to the matrix material. Thereafter, as the rotation of the matrix continues, that increment which has been heated in the first zone is brought into a second zone through which a relatively cool gas is passed, which gas then picks up the heat previously accumulated in the matrix member.

The gas flow is generally in the direction axially of the rotating element and there are substantial pressures developed on the matrix which impart a loading to the rotating element making the latter difficult to turn as intended. In certain installations, as where the hot gas is passed axially through the regenerator at a first zone or sector in one direction, and a cool gas is also passed axially, but in opposite direction, through a zone or section of the matrix diametrically opposite the first the pressure imparts a loading to the rotor resulting in a torque at right angles to the plane of the rotor. It is an important feature of this invention to provide mounting means for more positively supporting the rotor against this torque and to insure effectiveness of the seals employed to prevent by-passing of the gases.

There have, in general, up to the present time been two basic approaches to the construction of a torus type of rotary heat exchanger. The first of these is to use stationary compacting seal rings that rub against a precisely machined "doughnut" skin on the surface of the rotating toroidal matrix. In this sealing arrangement the matrix is best supported by stationary rollers bearing against the outer skin of the torus.

A second approach has been that of installing the seal rings on the rotor itself and allowing the seal rings to slide and seal on the toroidal shape of the inside of a stationary housing. Again the method of supporting the rotor has been to mount rollers in the rotating structure itself to bear against the toroidal inner surface of the stationary housing.

All such methods of roller support for toroidal matrix exchangers heretofore proposed are characterized by the fact that the supporting rollers are necessarily in a high temperature regime, with the result that methods of cooling and lubricating the supporting rollers are not practical.

It is accordingly a further object of the present invention to provide a support construction for a rotary matrix of toroidal configuration in a regenerative heat exchanger which places the support or bearing means for the rotor out of the zone of high temperature. It is still another object to provide a construction which permits practical lubrication and cooling of the support for the rotary matrix.

Other objects include simplifying the driving means for the rotor, and simplifying and improving the sealing means both with respect to prevention of leakage of fluid tending to axially by-pass the matrix, as well as preventing leakage circumferentially around the matrix and between adjacent segments thereof.

In brief, the invention comprises a toroidal type of regenerative exchanger in which the matrix is divided by substantially circular bulkheads disposed radially to form a plurality of generally sector-like compartments, as viewed perpendicular to the plane of the rotor. These bulkheads are mounted at their radially inner ends in a hub of generally annular form, which in turn, is supported interiorly so that it is substantially inboard of the path of flow of the hot fluids or gases involved in the heat exchange process. Furthermore, the hub bearings are enclosed by a housing or shroud for further protection against exposure to high temperature, so that a lubricant or coolant may be circulated over the bearings. Within the same bearing enclosure there are also included peripheral or circumferential seals which block the by-passing of the matrix in axial direction by the fluids flowing through the matrix. Each of the rotor bulkheads also carries a piston ring type of seal in its outer periphery, whereby to prevent leakage or by-passing of the heat exchange fluids circumferentially from one sector or compartment of the rotor to another, and the mounting of such ring seals is a further feature of the invention.

The advantages and improvements afforded by the present invention will become more evident from the following description of a specific embodiment illustrated in the accompanying drawings as showing one way of utilizing the invention.

In the drawings:

FIG. 1 is a longitudinal view in cross section of a typical gas turbine engine in which there is incorporated a rotary toroidal type of heat exchanger embodying the present invention;

FIG. 2 is an enlarged axial cross section of the rotary exchanger section, showing details of the matrix drive; and FIG. 3 is a further enlarged fragmentary view in axial cross section of the bearing support and hub seal.

Before describing in detail the rotary regenerator mounting and sealing arrangement of the invention, a brief general outline of the relation of such regenerator to a typical gas turbine engine will be made with reference to the illustration in FIG. 1.

Engine 10 comprises a compressor section 12 including an impeller 14 carried by shaft 16 which is suitably journaled in forward and aft bulkhead members 18, 19 of a housing or frame 20 serving generally to enclose the compressor and combustion sections of the turbine engine.

Air entering the annular intake 22 of the engine is compressed by impeller 14 into an annular plenum chamber 24 connected by suitable transition ducting 26 to an air inlet port 28 in the housing of rotary regenerator heat exchanger 30.

The compressed air passes axially through exchanger 30, exiting at air outlet port 32 which opens into a second plenum chamber 34. Plenum 34, in turn, communicates with a combustion chamber 36 by means of a plurality of ports 38 provided in annular rear bulkhead 40. An apertured flame tube 42 positioned in the combustion chamber is connected by suitable transition ducting to a first-stage or compressor turbine nozzle 44, and a turbine 46 is positioned adjacent this nozzle, being secured to the rear of shaft 16 for driving the compressor impeller 14.

Immediately behind this first-stage turbine 46 there is located a second turbine nozzle 50 and a turbine 52. This turbine nozzle is supported in bulkhead 19, while turbine 52 is mounted on shaft 54, the latter being journaled at 55, for rotation independently of the compressor shaft 16. Shaft 54 constitutes the power output shaft from which useful torque for motive purposes is obtained from the engine.

The engine is provided with a fuel nozzle and igniter, not shown, in the combustion chamber, and exhaust gases issuing from the chamber are directed by nozzles 44, 50, past the respective turbines 46, 52 causing them to be rotated. The exhaust gases then exiting from the turbine section are collected in a duct 56 which delivers them to port 58 in the housing of the rotary regenerator section 30. The gases pass axially through the matrix of the regenerator, emerging at port 60 of housing 30 and are then dumped overboard through suitable end-section ducting 62. It will be noted from the illustration that the compressed air duct 26 incorporates a return bend 64 forming part of the end-section. This is necessary to effect a desired counter-current passage of the air and exhaust gases during their respective passes through the regenerator.

The compressed air and exhaust gas ports in the regenerator housing 30 are generally diametrically opposite each other. Inlet air port 28, and the corresponding outlet 32 on the axially opposite side of the regenerator, extend arcuately about the regenerator substantially less than one-half of its periphery; while exhaust port 58 and its axially opposite counterpart 60 occupy an arcuate extent of substantially more than one-half the periphery of the regenerator unit. The difference in the size of the two sets of ports is of course designed to compensate for the difference in density of the relatively low temperature compressed air and high temperature exhaust gases. The arcuate extent of the seal tunnels between the ports of each set is, in each instance, no greater than the width of a segment or integral number or segments into which the regenerator matrix is divided by radial partitions or bulkheads to be further described. This is a necessary relationship in order to prevent leakage or by-passing of the gases within the regenerator unit.

Turning now to a more detailed consideration of the regenerator section 30 and the means of sealing and mounting the rotor in this section, this includes a split housing comprising sections 70, 72 which together form a hollow torus, being held together by bolts 71 spaced circumferentially around the central abutting flanges of the housing sections. Section 30 is mounted to the aft end of plenum 34 and the inner periphery of the regenerator meets with and forms an axial continuation of shroud 74 enclosing the forward section of the power shaft 54 immediately behind turbine 52.

The regenerator specifically here illustrated comprises a toroidal rotor, generally indicated at 80, which is of essentially circular cross-section as viewed in the axial plane of the engine. Rotor 80 is supported at its inner periphery by a suitably enclosed bearing and sealing structure or hub indicated generically at 100 in FIGS. 2 and 3 of the drawings.

Rotor 80 is essentially completely toroidal. Similarly, the housing sections 70, 72 form an essentially completely toroidal structure whose contour is interrupted by compressed air and exhaust gas ports previously mentioned.

The rotor itself is divided circumferentially into increments or segments by radial partitions 90 which latter are continuous in their periphery to conform closely to the interior cross-sectional area of the hollow torus formed by housing members 70, 72. As already mentioned, the matrix portion of rotor 80 is essentially circular in cross-section in the specifically illustrated example but may assume an egg-shape, elliptical or other peripherally smoothly continuous configuration for purposes of the invention.

Bearing enclosure 100 comprises a stationary hub portion 101 of generally annular configuration and a rotating hub portion 102 carried on said stationary hub by bearings 104, as best seen in FIGS. 2 and 3. Rotating hub 102 includes an internal ring gear 106 and a root portion 108 in which are secured the radially directed bulkheads 90 which divide the rotor matrix into a plurality of generally segmental compartments.

Stationary hub 101 is formed of two annular members of channel cross-section having their paired legs extending towards each other to form a torus of rectangular section. The first of these complementary channel members 110 has a radially inner leg 112 formed with an in-turned flange 114 and an axially extending lip 116. (See FIG. 3.)

The other channel member 118, in turn, is formed with a radially inner leg 119 provided at its extremity with an in-turned flange 120 adapted to abut flange 114 of the complementary hub portion 110. Leg 119 is stepped, as at 122, so as to telescopingly receive lip 116 of channel member 110. Channel sections 110 and 118 are secured together by suitable retaining means 124 which pass through the abutting flanges 114, 120.

The web sections 126, 128, of channel members 110, 118, respectively, form annular bulkheads enclosing the axially opposite ends of the stationary hub structure 110. An outer leg 130 on channel 110, and a corresponding leg 132 on channel member 118, each terminate respectively at the juncture of radial bulkheads 90 with the root portion 108 of rotating hub assembly 102.

Rotating hub assembly 102 includes axially opposed, generally identical, left and right ring members 133, 134 which are abutted at their inner ends, as viewed in FIGS. 2 and 3, against the central radial flange 135 of root member 108, being secured thereto by bolts 136 around the periphery of the flange.

The radially outer races of bearings 104 are carried on seats 137, 138 formed respectively on ring members 133, 134, while the inner races of the bearings are supported on lip 116 of stationary hub channel 110 and on leg 119 of channel 118. Bearings 104 are thus disposed on axially opposite sides of the central plane of rotation of the rotor, being relatively widely spaced so as to afford axially stability against torque loads imposed on the rotor.

Rings 133 and 134 also carry two sets of rotary seals which extend peripherally around the rotating hub assembly 102 within the stationary portion of hub 100. The first of these seals comprises axially spaced pairs of rings 140, of carbon, graphite or the like, one paired set of such rings being supported on each of legs 130, 132 immediately adjacent the root section 108 of the rotating hub and in sliding contact with annular surfaces 142, 144 and 146 and 148 of the rotating ring members 133, 134, respectively. Seals 140 are clamped or compressed against their respective ring members 133, 134 by identical retainer rings 152. Rings 152 are held in properly spaced axial relation to the inner seal surfaces 142, 146 by spacers 156 and by adjustable retainers 154.

Seals 140 are thus disposed at the upstream and downstream sides of the rotor assembly, at the root portion thereof, and serve to prevent fluid by-passing directly from the upstream to the downstream sides of the hub at this point.

The second set of seals mentioned above comprises identical seal rings 160, 160 which are carried on the non-rotating but axially adjustable transports 162, 162. Transports 162 are again of annular configuration and are each provided with a radially directed flange apertured to receive mounting studs 164 disposed in circumferentially spaced relation in webs 126, 128, respectively, of channel sections 110, 118. Compression springs 166 are disposed on studs 164 between the inner wall of the channel sections and the radial flange of transports 162, whereby to urge the transports axially inward toward the central plane of rotation of the rotor.

Each transport 162 is also formed with an axial flange 163 comprising a piston surface against which piston rings 168 bear to effect a seal against transport 162. Rings 168 are carried in suitable grooves formed in the respective legs 112, 119 of stationary channel members 110, 118.

Annular seals 160 bear against a rotating bearing retainer 170 which confines the outer races of bearings 104 on seats 137, 138 against flanges 137a, 138a provided on the respective rotating hub rings 133, 134. Retainers 170 are bored or slotted, as at 174, at a number of points around their peripheries to provide oil or coolant passages for circulation around bearings 104. Similar passages 176 are bored in rings 133, 134 immediately adjacent bearings 104 to complete the circulation path.

Retainers 170 are each held in their respectively abutting positions against bearings 104 by clamping rings 178 and retaining bolts 180 spaced around the clamping rings.

The two sets of rotary seals 160 and piston rings 168, together with rotating hub sections 133, 134 of the stationary channel sections 110, 118, define an annular chamber 182 enclosing bearings 104 and isolating from them exposure to high temperature zones as well as providing an enclosure for retaining a coolant or lubricant for the bearings.

To complete the sealing of the rotor 80 to prevent by-passing of the heat-exchanging fluids circumferentially of the rotor, each of the radially disposed bulkheads 90 is formed in its periphery with a piston ring groove within which there is disposed a piston ring 192. This extends peripherally around the bulkhead from one axial side of root portion 108 to the other of rotating hub assembly 102. Rings 192 bear against the inner surface of the toroidal housing formed by sections 70, 72, making a sliding fit thereagainst. Rings 192 are retained at their opposite ends by the terminal lips 130a, 132a, respectively of legs 130, 132 of stationary annular housing 100.

Power to drive rotor 80 is picked up from turbine shaft 54 through pinions 190, 192 and supplied to driving pinion 194 through countershaft 196 journaled at 198, 199, 200 within a housing 202 supported by stationary hub 100 within the annulus defined by the hub. Driving pinion 194 engages ring gear 106 of the rotating hub 102 to rotate the latter. An access hole 204 provided in leg 118 forming the inner wall of the bearing enclosure allows pinion 194 to project into engagement with ring gear 106.

Lubrication of bearings 104 and of the drive transmission for rotor 80 is supplied at a fitting 206 feeding into the annular space 182 in hub 100 defined by seals 160, 168 and the rotating rings 133, 134 of the rotor assembly. The feed point is adjacent the uppermost point of the hub, as viewed in FIG. 2, and the lubricant flows by gravity around the interior of the hub, over the bearings and root portions of the rotor, thereby cooling them. Return of lubricant is effected through fitting 208 in the low point of the transmission housing 202, and fitting 210 in the lower half of the hub.

What is claimed is:

1. In a regenerative heat exchanger having a frame and an annular heat exchange matrix rotatably mounted thereon, the improvement in mounting means for said matrix whereby to dispose it radially completely outside said mounting means, which comprises, a stationary hub member carried by said frame and comprising complementary annular members of channel section having their paired legs extending toward each other axially of the exchanger with the radially inner legs thereof joined together and the radially outer legs terminating in axially spaced relation to form a central opening extending completely around the outer periphery of said annulus, a rotary hub member having an inner root portion located within said annulus in radially spaced relation to the joined inner legs thereof, and an outer portion complementary to said outer legs thereof to substantially fill said central opening therein while permitting rotation relative to said outer legs, bearing means disposed between said stationary hub member and said inner root portion of said rotary hub member to support the latter for rotation on the former, seal means spaced axially on said hub members to complete the enclosure of said bearing means within said annulus, said seal means being supported on said channel sections to provide circumferentially continuous but relatively slidable seals adjacent the radially inner and outer peripheries of said root portion of said rotary hub member, and means for introducing a lubricant or coolant to said annulus.

2. In a regenerative heat exchanger as defined in claim 1, wherein said stationary hub is provided with an aperture in its inner periphery giving access to said annular space between said hub members, and driving means extending into said aperture from within said stationary hub member to effect driving contact with said root portion to effect rotation of said rotary hub member.

3. The improvement in mounting means for the rotary member of an annular regenerative heat exchanger as defined in claim 1, wherein the opening formed by the axially spaced outer legs of said stationary hub member is located symmetrically of the central radial plane of said rotary hub member and said bearing means supporting said member for rotation straddle said central radial plane.

References Cited

UNITED STATES PATENTS

| | | | |
|---|---|---|---|
| 2,423,973 | 7/1947 | Halford | 308—77 X |
| 2,598,182 | 5/1952 | Kolb | 165—8 |
| 2,953,901 | 9/1960 | Chute | 165—7 X |
| 3,145,534 | 8/1964 | Williams et al. | 165—8 X |
| 3,177,928 | 4/1965 | Tumaricus et al. | 165—7 |
| 3,194,302 | 7/1965 | Kronogard | 165—9 |

ROBERT A. O'LEARY, *Primary Examiner.*

T. W. STREULE, *Assistant Examiner.*